United States Patent [19]

Harigae et al.

[11] Patent Number: 5,258,976
[45] Date of Patent: Nov. 2, 1993

[54] METHOD OF ASSEMBLING REPRODUCTION-ONLY DISCS FOR A REPRODUCTION/RECORDING APPARATUS

[75] Inventors: Makoto Harigae; Yuichi Nakamura, both of Tokyo, Japan

[73] Assignee: Kabushiki Kaisha Toshiba, Kanagawa, Japan

[21] Appl. No.: 701,313

[22] Filed: May 17, 1991

Related U.S. Application Data

[62] Division of Ser. No. 441,919, Nov. 28, 1989, abandoned.

[30] Foreign Application Priority Data

Dec. 2, 1988 [JP] Japan ............................ 63-304071
Dec. 15, 1988 [JP] Japan ............................ 63-314946

[51] Int. Cl.$^5$ .......................... G11B 23/00; G11B 7/24
[52] U.S. Cl. ........................................ 369/290; 369/289
[58] Field of Search ............... 369/290, 291, 270, 271, 369/280, 281, 282, 289, 272

[56] References Cited

U.S. PATENT DOCUMENTS

| | | | |
|---|---|---|---|
| 3,805,292 | 4/1974 | Hashiguchi et al. | 360/135 |
| 4,787,009 | 11/1988 | Takahashi | 369/290 X |
| 4,827,468 | 5/1989 | Odawara et al. | 369/271 |
| 4,866,697 | 9/1989 | Yamaguchi et al. | 369/290 |
| 4,903,224 | 2/1990 | Namiki et al. | 369/290 |

FOREIGN PATENT DOCUMENTS

| | | | |
|---|---|---|---|
| 0051339 | 5/1982 | European Pat. Off. | 369/291 |
| 0230963 | 5/1987 | European Pat. Off. | 369/290 |
| 0204842 | 9/1986 | Japan | 369/272 |

*Primary Examiner*—John W. Shepperd
*Attorney, Agent, or Firm*—Finnegan, Henderson, Farabow, Garrett and Dunner

[57] ABSTRACT

An information storage medium apparatus is provided which comprises one or two reproduction-only optical disc(s) incorporated in a cartridge. The cartridge can be applied to a conventional information recording and reproducing apparatus without any additional operation.

10 Claims, 3 Drawing Sheets

METHOD OF ASSEMBLING REPRODUCTION-ONLY DISCS FOR A REPRODUCTION/RECORDING APPARATUS

This application is a division, of application Ser. No. 07/441,919, filed Nov. 28, 1989 now abandoned.

BACKGROUND OF THE INVENTION

1. Field of the Invention

This invention relates to an information storage medium apparatus, and more particularly to an information storage medium apparatus that can be applied to information processing apparatus other than a specified reproduction-only apparatus.

2. Description of the Prior Art

In recent years, optical discs have been widely used as information storage media that reproduce image information or acoustic information. The recording or reproduction of such information is performed by applying laser beams to a rotating optical disc. In comparison with magnetic information storage media, the optical discs have larger storage capacities per unit area, and stable low-noise reproduction characteristics. The optical disc can record or reproduce information with a non-contact operation, resulting in the following advantages. Specifically, no wear can occur in the storage medium surface and the laser-beam applying head. Further, optical recording or reproduction is substantially independent of surrounding disturbances as compared to magnetic processing.

In general, optical discs may be classified into the following three types in terms of their applications and structures. The first type thereof is a reproduction-only optical disc which can only reproduce the previously recorded information. The first-type optical disc includes three different discs, such as a VD (video disc), a CD (compact disc) and a CD-ROM (CD read-only memory). The VD has image information recorded thereon in analog signals, and the CD has acoustic information recorded thereon in digital signals. The CD-ROM has the coded information of a computer or the contents of a dictionary recorded thereon in digital signals. The copies of these discs can be easily formed by molding with a stamper. Thus, such discs can be mass-produced and provided at lower prices. As a result, these discs have been widely used in various applications. The first-type optical disc is usually incorporated in a protective container such as a plastic case. When in use, the optical disc per se is taken out of the container, and is placed in an reproduction-only apparatus.

Further, the first-type optical disc consists of the following three layers. Specifically, a transparent polycarbonate disc of about 1.2 mm thick is prepared to form a large number of pits corresponding to signals on the surface of the disc. An aluminum thin film, which serves as a reflector layer, is sputtered on the surface of the polycarbonate disc. A protective layer of hard resin is then formed on the reflector layer. A second-type optical disc is an additional writing-type optical disc on which information can be additionally written. However, additional writing can be made only once in the same area because written information cannot be erased. Thus, the second-type optical disc has been adapted to applications in which the operator must additionally write information in a blank area as required. The added information can be stored over long period. A third-type optical disc is a rewritable-type optical disc on which information can be recorded and erased repeatedly. The third-type optical disc can record information of very high density. Thus, the discs of this type have been used as large-capacity storage media in information processing systems.

The additional writing-type optical disc and the rewritable-type optical disc are usually incorporated in a cartridge 21, as shown in FIG. 6. This is because the surface of the optical disc must be protected from dust and external forces. When in use, the cartridge 21 is inserted in an information recording and reproducing apparatus in the direction of arrow A. In this case, the optical disc remains in the cartridge 21 without being taken out of it. When the cartridge 21 is set on a prescribed position in the apparatus, a shutter 22 is automatically opened in the direction of arrow B. As a result, a part of the optical disc is exposed through a window 23. Namely, the optical disc is protected from unnecessary exposure.

In the case of the reproduction-only optical disc, the optical disc is taken out of its container, and placed on a reproduction-only apparatus. Specifically, in the reproduction-only apparatus, an optical disc 24 is set on a turntable 25 and secured by a depressing member 26, and then rotated by an electric motor 27, as shown in FIG. 7. Therefore, the reproduction-only optical disc cannot be applied to an information recording and reproducing apparatus. This causes many disadvantages when the optical discs of various types must be handled.

SUMMARY OF THE INVENTION

Accordingly, one object of this invention is to provide an improved information storage medium apparatus that can be applied to information processing apparatus other than a specified reproduction-only apparatus.

Briefly, in accordance with one aspect of this invention, there is provided an information storage medium apparatus which comprises an information storage disc having a center hole, a connecting member inserted to the center hole of the information storage disc, a rotational force transmitting member attached to the connecting member, an electric motor for rotating the information storage disc by use of the rotational force transmitting member, and a container for incorporating at least one said information storage disc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
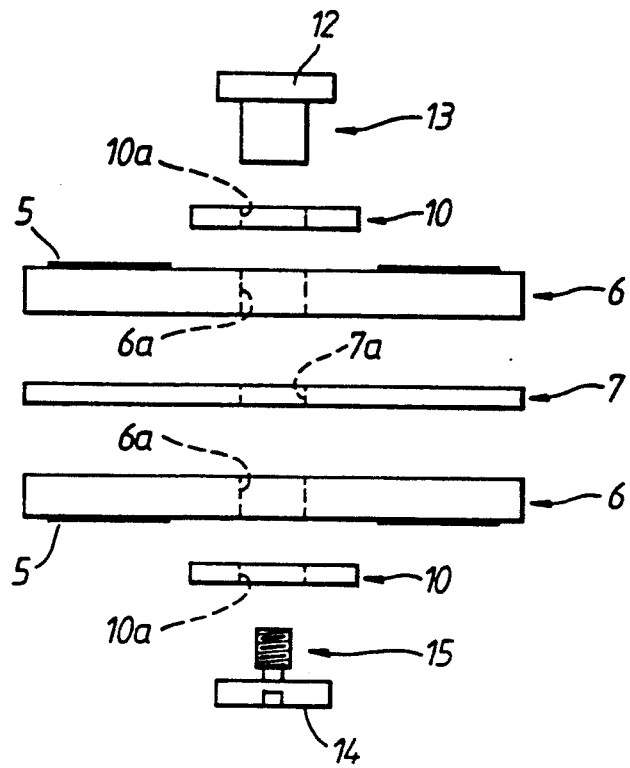
FIG. 1 is an exploded view illustrating essential portions of one embodiment according to the present invention.

Referring now to the drawings, wherein like reference numerals designate identical or corresponding parts throughout the several views, and more particularly to FIG. 1 thereof, one embodiment of this invention will be described.

Figure 2:
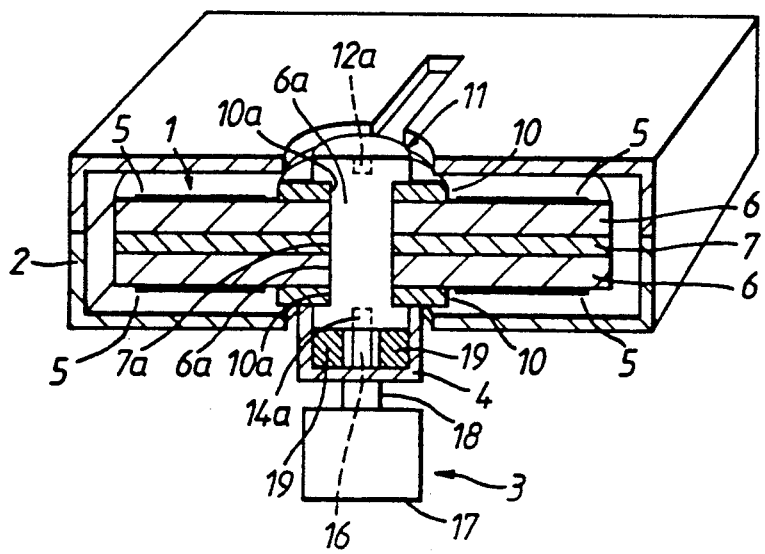
FIG. 2 is a cross-sectional view illustrating one embodiment according to the present invention.
Figure 6:
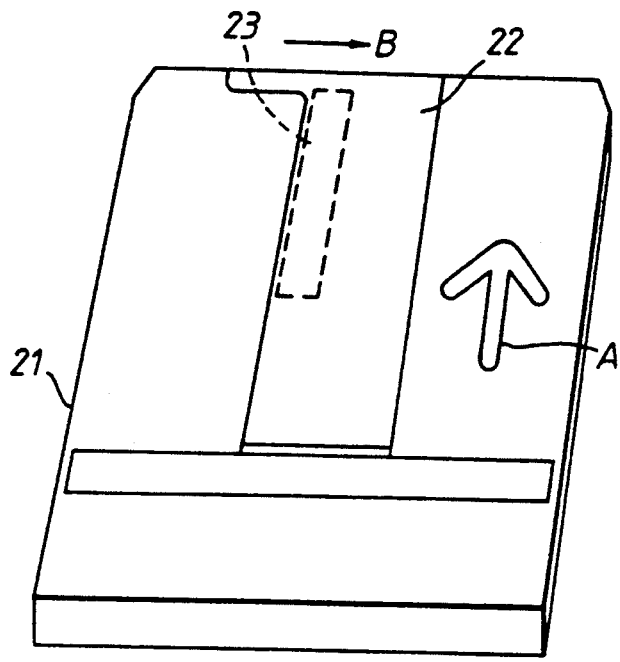
FIG. 6 is a perspective view illustrating a conventional cartridge for incorporating an optical disc.
Figure 7:
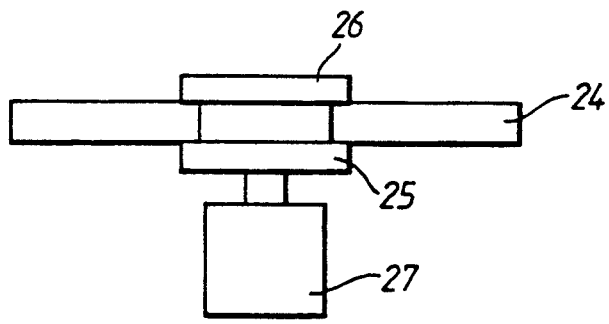
FIG. 7 is a schematic view illustrating a conventional information storage medium apparatus when in use.

FIG. 1 is an exploded view of an information storage medium apparatus in one embodiment according to the present invention. FIG. 2 shows an assembled state of the apparatus of FIG. 1. In FIGS. 1 and 2, a disc 1, which comprises two reproduction-only optical discs such as CDs (compact discs), for example, is incorporated in a cartridge 2. When in use, the cartridge 2 with the disc 1 incorporated therein is inserted in an information recording and reproducing apparatus. In the apparatus, the cartridge 2 is automatically set on a turntable 4 of a disc-rotating unit 3 in the following manner. Specifically, the cartridge 2 with disc 1 is automatically received by a cartridge receiving and mounting mechanism (not shown). A shutter (not shown) of the cartridge 2 is then automatically opened so as to expose a part of the disc 1. This is performed in the same manner as described in FIG. 6. Thereafter, the cartridge 2 is automatically set on the turntable 4 at a prescribed position.

The disc 1 is assembled in the following manner. Specifically, two substrates 6, which have information storage layers 5 on the respective outer surfaces, are stacked sandwiching an inner spacing member 7 therebetween. The outer sides of the substrates 6 are provided with outer spacing members 10. The substrates 6, the inner spacing member 7 and the outer spacing members 10 are provided with center holes 6a, 7a and 10a, respectively. A connecting member 11 is fittend into the center holes 6a, 7a and 10a so as to securely unite the substrates 6, the member 7 and the members 10. The connecting member 11 is made of a ferromagnetic material. The member 11 comprises a cylindrical member 13, which has an internally threaded portion in the inner surface thereof, and member 15. The a screw 13 has a brim portion 12 at the upper part thereof, and the screw 15 has a brim portion 14 at the lower part thereof.

Figure 3:
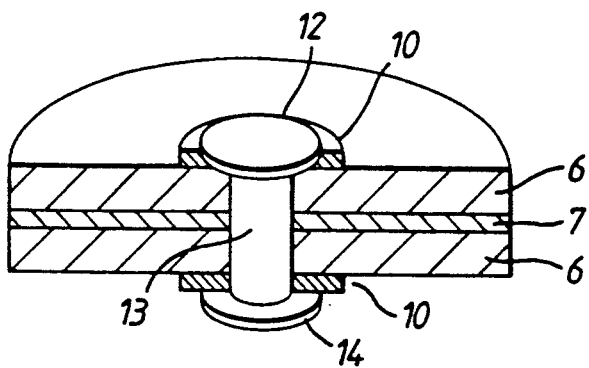
FIG. 3 is a perspective cross-sectional view illustrating an essential portion of one embodiment according to the present invention.
Figure 4:
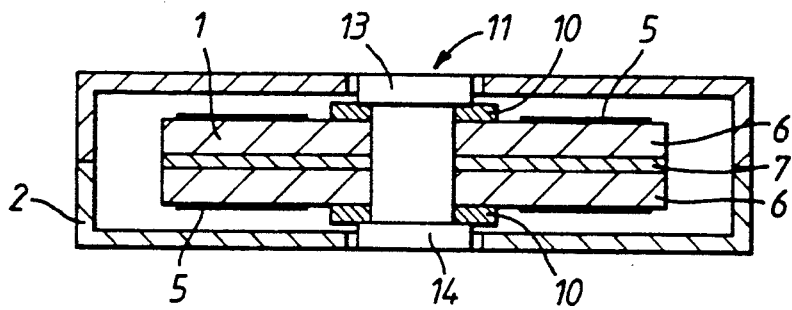
FIG. 4 is a cross-sectional view illustrating an essential portion of one embodiment according to the present invention.
Figure 5:
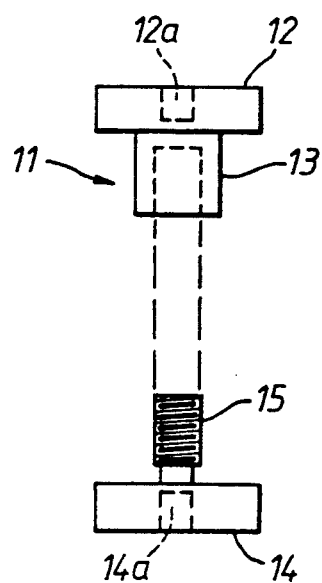
FIG. 5 is an exploded view illustrating parts employed in one embodiment according to the present invention.

Further, centering holes 12a and 14a are provided in the brim portions 12 and 14 at the center portions thereof, respectively. A centering pole 16 of the turntable 4 is fitted into the centering hole 14a (in the case of FIG. 2) or into the centering hole 12a. When the substrates 6 and the inner and outer spacing members 7 and 10 are united, the cylindrical member 13 is inserted in the center holes 6a, 7a and 10a. The screw 15 is then screwed into the internally threaded portion which is cut in the inner surface of the cylindrical member 13, as shown in FIG. 3. The thus secured substrates 6 are incorporated in the cartridge 2, as shown in FIG. 4. In FIG. 2, a drive unit 3 comprises an electric motor 17 and a turntable 4 attached to a rotation shaft 18 of the motor 17. The turntable 4 is made of a nonmagnetic material, and the upper part thereof is formed into a concave portion. A permanent magnet 19 is fixed inside the concave portion. The connecting member 11 of the disc 1 is magnetically attracted by the magnet 19. The outside diameters of the brim portions 12 and 14 of the connecting member 11 are slightly smaller than the inside diameter of the concave portion of the turntable 4.

In FIG. 2, the brim portion 14 is fitted into the concave portion of the turntable 4. Further, the centering pole 16 of the turntable 4 is fitted into the centering hole 14a. As a result, the disc 1 and the turntable 4 are securely coupled without shifts when in operation. When the disc 1 is set on the turntable 4, a reproducing head (not shown) opposes the information storage layer 5 of the lower substrate 6. The disc 1 is rotated, and the head is moved in the radial direction of the disc 1 by a linear motor and the like (not shown). Thus, the reproduction of the information stored on the layer 5 can be performed.

As described above, two reproduction-only optical discs are united by screws with a connecting member, and incorporated in a cartridge. Thus, the cartridge with two reproduction-only optical discs incorporated therein can be inserted into a information recording and reproducing apparatus. As a result, the reproduction of such discs can be satisfactorily performed. Moreover, such discs can be handled without being taken out of the cartridge, thus resulting in easier operation. In this embodiment, two reproduction-only optical discs are incorporated in the cartridge 2. However, a single disc thereof may also be incorporated in a cartridge.

Obviously, numerous additional modifications and variations of the present invention are possible in light of the above teachings. It is therefore to be understood that within the scope of the appended claims, the invention may be practiced otherwise than as specifically described herein.

What is claimed is:

1. A method of assembling reproduction-only discs having center holes into a recording or reproducing apparatus which includes a turntable, the reproduction-only discs each having an information storage layer on one surface thereof, comprising the steps of:

stacking two otherwise separately usable reproduction-only discs with their center holes coincident so that each information storage layer of said two reproduction-only discs is oriented toward the outside thereof;

inserting a cylindrical member in the center holes of said stacked reproduction-only discs, said cylindrical member having a cylindrical portion and a first brim portion, said cylindrical member also having an internally threaded portion therein which is exposed at an opening in one end of said cylindrical member, said first brim portion being at the other end of said cylindrical portion and having an outside diameter larger than the diameter of said center hole;

fixing said reproduction-only discs between said first brim portion and a second brim portion included on a screw by screwing said screw into said internally threaded portion, said second brim portion being shaped the same as said first brim portion; and inserting one of said first or second brim portions in a concave portion of the turntable, said concave portion holding said reproduction-only discs in said recording or reproducing apparatus.

2. The method of claim 1, wherein said concave portion includes a permanent magnet and said first and second brim portions include magnetic material and wherein said inserting step includes the substep of magnetically fixing the brim portion.

3. A method of assembling reproduction-only discs each having an information storage layer on one surface thereof into a recording or reproducing apparatus which uses a cartridge having an opening for a recording and reproduction disc, said apparatus including a supporting member having a concave portion for rotatably supporting said reproduction-only disc in said opening, the method comprising the steps of:

stacking two otherwise separately usable reproduction-only discs having center holes so that the center holes are coincident with each other and so that each information storage layer of said two reproduction-only discs is oriented toward the outside thereof;

inserting a cylindrical member in the center holes of said stacked reproduction-only discs, said cylindrical member having a cylindrical portion and a first brim portion, said cylindrical member also having an internally threaded portion therein which is exposed at an opening in one end of said cylindrical member, said first brim portion formed on the other end of said cylindrical portion and having an outside diameter larger than the diameter of said center holes;

inserting a screw into the center holes, said screw having a second brim portion being shaped the same as said first brim portion;

fixing said reproduction-only discs between said first and second brim portions by screwing said screw into said internally threaded portion, thereby obtaining fixed reproduction-only discs;

placing said fixed reproduction-only discs in said cartridge;

inserting said cartridge in said recording or reproducing apparatus; and inserting one of said first or second brim portions in said concave portion.

4. A method of supporting different types of media including both reproduction-only type media having a center hole and writing/reproduction type media, only one type of media being supported at any one time, wherein each type of media is supported at a supporting part of a recording or reproducing apparatus, comprising:

inserting a cylindrical member in the center hole of a medium selected from said reproduction-only type media, said medium including two reproduction-only discs, said cylindrical member having a first supporting member on one end thereof;

fixing said selected medium between said first supporting member and a second supporting member located at one end of a fixing member, said second supporting member having the same shape as said first supporting member; and supporting one of said first and second supporting members on said supporting part.

5. The method of claim 4, wherein said first supporting member includes a first brim portion having the outside diameter larger than the diameter of said center hole.

6. The method of claim 5, wherein said cylindrical member has an open end opposite said end including said first supporting member and an internally threaded portion in said open end.

7. The method of claim 6, wherein said second supporting member includes a second brim portion having the outside diameter larger than the diameter of said center hole.

8. The method of claim 7, wherein said fixing member includes a screw being screwed in said internally threaded portion.

9. The method of claim 8, wherein said supporting part includes a concave portion being inserted in one of the first and second brim portions.

10. A method for reproducing information stored in reproduction-only discs each having an information storage layer on one surface thereof by using a recording or reproducing apparatus other than a specified reproduction-only apparatus, the reproduction-only discs having center holes, the recording or reproducing apparatus including a turntable, comprising the steps of:

stacking two otherwise separately usable reproduction-only discs with their center holes coincident so that each information storage layer of said two reproduction-only discs is oriented toward the outside thereof;

inserting a cylindrical member in the center holes of said stacked reproduction-only discs, said cylindrical member having a cylindrical portion and a first brim portion, said cylindrical member also having an internally threaded portion therein which is exposed at an opening in one end of said cylindrical member, said first brim portion being at the other end of said cylindrical portion and having an outside diameter larger than the diameter of said center holes;

fixing said reproduction-only discs between said first brim portion and a second brim portion included on a screw by screwing said screw into said internally threaded portion, said second brim portion being shaped the same as said first brim portion; and inserting one of said first or second brim portions in a concave portion of the turntable, said concave portion holding said reproduction-only discs in said recording or reproducing apparatus.

* * * * *

UNITED STATES PATENT AND TRADEMARK OFFICE
CERTIFICATE OF CORRECTION

PATENT NO. : 5,258,976
DATED : November 2, 1993
INVENTOR(S) : Makoto Harigae et al.

It is certified that error appears in the above-indentified patent and that said Letters Patent is hereby corrected as shown below:

Column 5, line 47, change "at" to --on--.

Signed and Sealed this

Sixth Day of September, 1994

Attest:

BRUCE LEHMAN

Attesting Officer  Commissioner of Patents and Trademarks